UNITED STATES PATENT OFFICE.

KAZUO HORII, OF HOKKAIDO, JAPAN.

PROCESS OF RESUSCITATING SPENT DRY CELLS.

1,311,559.     Specification of Letters Patent.     Patented July 29, 1919.

No Drawing.     Application filed May 29, 1918.     Serial No. 237,235.

*To all whom it may concern:*

Be it known that I, KAZUO HORII, subject of the Emperor of Japan, residing at No. 6 13-Chome, Miyashita Dori, Asahigawa Ku, Hokkaido, Japan, have invented new and useful Improvements in Processes of Resuscitating Spent Dry Cells, of which the following is a specification.

This invention relates to a process for resuscitating dry cells, particularly that kind of dry cells in which carbon is used as the positive pole, zinc plate as the negative pole, peroxid of manganese as the depolarizer, and chlorid of ammonium as the exciting fluid; and consists in boring a hole through a spent cell, filling the hole with a mixture of chlorid of ammonium, chlorid of sodium and oxalic acid, heating the cell thus filled until it gives out vapor, and then submerging it in water, thus cooling the cell and causing the water to enter therein.

The object of this invention is to resuscitate by a simple method the electricity generating power of a spent dry cell by removing injurious matters and causing exciting fluid to be evenly distributed in the cell.

Dry cells become ineffective when used for a certain period, and even when they are not used, they lose their efficacy after the lapse of a certain period of time, notwithstanding that the zinc plates, peroxid of manganese and other exciting materials are still remaining; and they become utterly useless. Several attempts have been made to recover the efficacy of spent dry cells by pouring a solution of chlorid of ammonium, but in none of these the object was obtained in any satisfactory manner.

This invention is an improvement on such a process, and the following is an example of carrying it into practice.

Prepare a mixed solution of 200 grams of chlorid of sodium, 120 grams of chlorid of ammonium, 40 grams of oxalic acid. 20 grams of anilin dye and 1500 grams of water, and pour the solution thus prepared in a vertical hole pierced in a spent cell from the top through the part where the depolarizer is packed. Heat the cell thus filled with the said solution until it gives out vapor abundantly, and then plunge it into water to cool, at the same time causing water to penetrate into the interior of the cell.

I am aware that there is known a kind of cells which is so constructed that exciting fluid such as chlorid of ammonium or the like is poured in now and then, but even in such a cell, the efficacy gradually dissipates notwithstanding that large amounts of zinc and manganese peroxid are still remaining.

From investigation I have found that the dissipation of dry cells is due to the fact that the electricity exciting action goes on, the chlorid of zinc being acted upon by the ammonia produced by decomposition of chlorid of ammonium forms glue-like hydroxid or oxychlorid of zinc, which covers the faces of the zinc plates, and that the depolarizer too is made inactive being covered by low grade oxid of manganese. Now, with the object of removing these injurious products formed in the action of exciting electricity, I pour the hereinbefore described mixed solution into a spent dry cell and by heating make the solution boil in the cell, which makes the said injurious products soluble. Then by plunging the cell into water while it is hot, the vapor therein is caused to condense which producing a vacuum makes the water penetrate into the cell and effects even distribution of the exciting fluid. Thus the efficacy of a spent cell is most satisfactorily restored.

According to this invention, at least 50% of the original capacity of an utterly spent dry cell can be easily recovered, and this process can be repeated several times (generally four or five times) until the casing is so mutilated that fluid leaks through it.

I claim:—

1. A process for resuscitating spent dry cells, consisting in boring a hole in a spent dry cell, filling the said hole with a mixed solution of chlorid of ammonium, chlorid of sodium, and oxalic acid, heating the cell and then plunging the same into water, substantially as and for the purpose hereinbefore set forth.

2. A process for resuscitating spent dry cells, consisting in boring a hole in a spent dry cell, filling the said hole with aqueous solution of chlorid of ammonium, chlorid of sodium, and oxalic acid, heating the cell till vapor is emitted, and then cooling the cell by plunging the same into water, thus causing water to penetrate into the cell, substantially as and for the purposes hereinbefore set forth.

3. A process of resuscitating spent dry cells which consists in rendering the injurious products on the surface of the electrode and depolarizers soluble by injecting an exciting fluid into the cell, boiling the fluid in the cell, and then adding water thereto.

4. A process as embodied in claim 3 wherein the water is added by submerging the cell into cool water while the exciting fluid is in the heated state.

5. A process of resuscitating spent dry cells which consists in injecting into a cell a mixed solution of chlorid of ammonium, chlorid of sodium and oxalic acid in the proportions specified, heating the cell, and then plunging the same into water.

In testimony whereof I have signed my name to this specification in the presence of two subscribing witnesses.

KAZUO HORII.

Witnesses:
H. F. OLFRUCIUS,
YOSHIO KAWADA.